Patented July 8, 1941

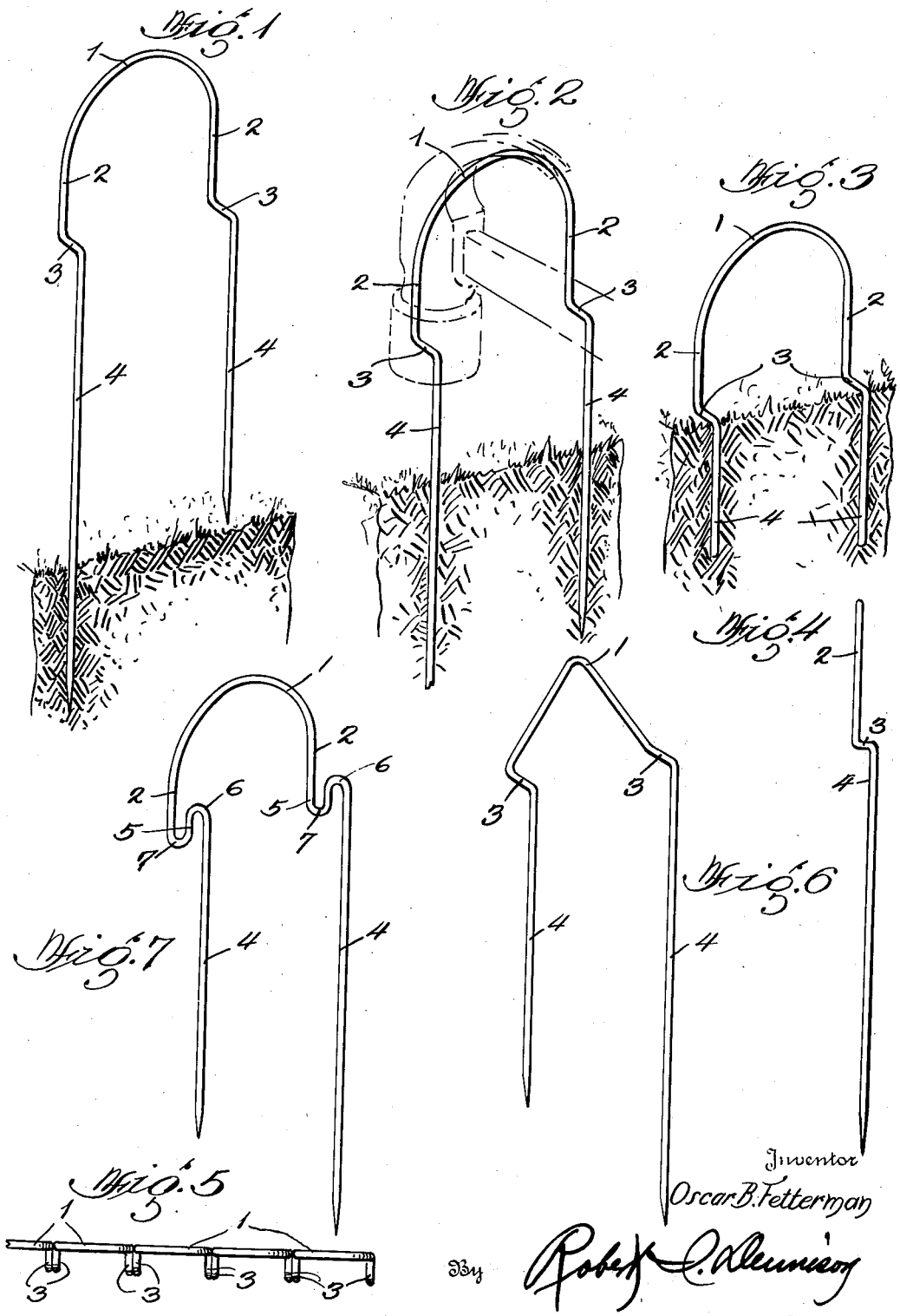

2,248,860

UNITED STATES PATENT OFFICE 2,248,860

FENCE WICKET

Oscar B. Fetterman, Washington, D. C.

Application December 23, 1940, Serial No. 371,459

5 Claims. (Cl. 256—33)

This invention relates to wickets of the type used for forming a low fence or guard for a grass plot or flower bed and it is one object of the invention to provide a wicket of such formation that it may be very easily thrust into the ground and then driven into place or forced into the ground by grasping portions of the two arms of the wicket and then exerting downward pressure to force the wicket into the ground until the arms penetrate the ground to such an extent that the wicket will be firmly held in place.

Another object of the invention is to provide the arms of the wicket with horizontally extending portions constituting shoulders to be grasped in a person's hands when initially thrusting the wicket into the ground and then struck with a hammer in order to drive the wicket downwardly until the shoulders make contact with the ground and not only limit further downward movement of the arms but also serve as braces for maintaining the wicket in a perpendicular position.

Another object of the invention is to so dispose the shoulders that when a number of wickets are used to form a fence the shoulders will be disposed laterally of the fence where they serve very effectively to prevent the wickets from being bent out of the line of fencing and in addition will not prevent the wickets from being set in place with their side arms in close contacting engagement with each other and form a continuous line of fencing.

Another object of the invention is to provide a wicket having one arm of greater length than the other whereby when setting the wicket in place the longer arm may be first thrust into the ground in close proximity to another wicket and the wicket then turned about the embedded arm until the wicket is in proper alinement with a line of fencing and the two arms of the wicket then both forced or driven into the ground until the shoulders make contact with the ground.

Another object of the invention is to provide a wicket formed of stiff wire which is simple in construction, inexpensive and very efficient in carrying out the purposes for which it is designed.

With these and numerous other objects in view, my invention consists in the novel features of construction, combination and arrangement of parts as will be hereinafter referred to and more particularly pointed out in the specification and claims.

Figure 1 is a perspective view showing a wicket of the improved construction with its longer arm thrust into the ground.

Figure 2 is a perspective view showing the wicket partially set with both arms entering the ground, a hammer for driving arms of the wicket into the ground being indicated by dotted lines.

Figure 3 is a perspective view showing the wicket in its fully set position.

Figure 4 is a side edge view of the improved wicket.

Figure 5 is a top plan view showing a line of fencing formed with wickets of the improved construction.

Figure 6 is a perspective view of a modified form of wicket.

Figure 7 is a perspective view of another modified form of wicket.

A wicket of the improved construction is formed from a strand of thick wire or a thin metal rod of such length that it may be bent to form a wicket of predetermined length. This wicket has an upper crown portion 1 which is of inverted U-shaped formation and has side arms 2, the rod or strand being then bent to form horizontally extending portions 3 constituting shoulders which are interposed between the arms 2 and the legs 4 of the wicket. This construction causes the legs 4 to be disposed in a plane parallel to the plane of the arms 2.

Referring to Figure 1, it will be seen that one leg is of appreciably greater length than the other and that when the wicket is set in place the longer arm will first be thrust into the ground and constitute an axis about which the wicket may be turned. It will thus be seen that the wickets for forming a fence may be successively set in place along a fence line with the longer leg of each wicket first thrust into the ground and the wicket then swung about the embedded leg as a pivot until its upper portion or bridge is in alinement with the bridge of a previously set wicket and the fence will accurately follow the fence line. The shorter leg is then forced downwardly into the ground until the two shoulders 3 make contact with the ground as shown in Figure 3. The wickets of a fence will then all be of the same height and since the shoulders rest upon the ground they will serve as braces for restraining the wickets against transverse tilting and the wickets will be retained in an upright or perpendicular position.

Attention is further called to the fact that the shoulders may be grasped and used as handholds when thrusting the legs of the wicket into the ground and that after the sharpened ends of the legs have been engaged in the ground, a hammer may be used for striking blows against the shoulders, as shown in Figure 2, and driving the legs into the ground until the shoulders strike the ground. The fact that the shoulders extend from the arms 2 transversely of the wicket instead of longitudinally of its bridge portion disposes the shoulders in position where they may be readily struck with a hammer and in addition so locates the shoulders that when setting the wickets in place for forming a fence, the legs, shoulders, and arms of adjoining wickets may have close contacting engagement with each other and form a fence which is free from breaks, as shown in Figure 5. Instead of disposing the wickets in alinement they may be in overlapping relation to each other with their shoulders extending from the same side of the fence or the shoulders of the adjoining wickets may project from opposite sides of the fence.

In Figures 6 and 7 there have been shown wickets of modified constructions. In Figure 6 the wicket is of the same construction shown in Figures 1, 2, and 3 except that the upper crown portion 1 thereof is of an inverted V-shape instead of being an inverted U-shape.

The wicket illustrated in Figure 7 has an upper portion which is of an inverted U-shape but the portions of the rod or strand which are bent to form shoulders are so bent that they form S-shaped portions 5. The upper ends 6 of these S-shaped portions or shoulders 5 constitute driving heads for the legs 4 of the wicket to be struck with a hammer when driving the legs into the ground and the lower ends 7 constitute abutments which may rest upon the ground or may be driven into the ground to assist in holding the wickets perpendicular.

The wickets may be painted any suitable color and arranged around the edge of a lawn or flower bed, and when properly set in the ground, will present an attractive appearance. The crown portions of the wickets may be curved back to further add to the ornamentality of the same.

While I have shown the preferred embodiment of my invention, it is to be understood that various changes in the size, shape and arrangement of parts may be resorted to without departing from the spirit of the invention and the scope of the appended claims.

Having thus described the invention, what is claimed is:

1. A fence wicket including a bridge portion and depending arms for penetrating the ground and supporting the wicket, each arm having a portion bent to extend laterally from a side of the wicket and provide an impact receiving means for forcing the arms into the ground, and thereby the bridge portion is offset with respect to the arms without increasing the width of the wicket.

2. A fence wicket including a bridge portion and depending arms for penetrating the ground, the arms having shoulders constituting handholds when thrusting the arms into the ground and disposed transversely of the wicket in position to be struck with a hammer when driving the arms into the ground, without increasing the width of the wicket, and precluding interference with an adjacent wicket that has been driven into the ground.

3. A fence wicket comprising a metal strand bent to form a bridge and arms depending therefrom, the arms being bent to provide upper and lower portions and an intermediate impact receiving portion extending transversely of the wicket and disposing the lower portion of the arms in offset relation to the upper portion of the arms, the said intermediate portions constituting means to facilitate forcing of the arms into the ground, the distance between the arms being substantially uniform throughout their length.

4. A fence wicket comprising a metal strand bent to form a bridge and arms depending therefrom, the arms being bent to form shoulders extending from a side of the wicket whereby the lower portions of the arms are disposed in a plane parallel to the plane of the upper portions of said arms.

5. A fence wicket including a bridge portion and depending arms for penetrating the ground and supporting the wicket upright, one arm being longer than the other and extending downwardly beyond the shorter arm, the bridge portion being offset with respect to the ground penetrating portions of the arms, so as to be disposed in a different plane than that of the arms, without increasing the width of the wicket.

OSCAR B. FETTERMAN.